United States Patent
Levanoni et al.

(10) Patent No.: US 6,748,371 B1
(45) Date of Patent: Jun. 8, 2004

(54) DATA MINING TECHNIQUES FOR ENHANCING PRODUCT MANUFACTURING MANAGEMENT

(75) Inventors: Menachem Levanoni, Yorktown Heights, NY (US); Jerome M. Kurtzberg, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 660 days.

(21) Appl. No.: 09/612,683

(22) Filed: Jul. 10, 2000

(51) Int. Cl.⁷ .............................................. G06F 17/30
(52) U.S. Cl. ................. 707/2; 707/1; 707/100
(58) Field of Search ........................... 707/1, 2–4, 100; 706/15

(56) References Cited

U.S. PATENT DOCUMENTS 5,970,476 A * 10/1999 Fahey ........................ 705/28
6,240,411 B1 * 5/2001 Thearling ..................... 707/5
6,324,520 B1 * 11/2001 Walker et al. ................ 705/16

* cited by examiner

Primary Examiner—Greta Robinson
Assistant Examiner—Cheryl Lewis
(74) Attorney, Agent, or Firm—Stephen C. Kaufman, Esq.; McGinn & Gibb, PLLC

(57) ABSTRACT

A computer method for enhancing product manufacturing management. The method includes the steps of providing a demand database comprising a compendium of individual demand history; providing a manufacturing database comprising a compendium of at least one of product manufacturing management solutions, product manufacturing information, and product manufacturing diagnostics; and, employing a data mining technique for interrogating the demand and manufacturing databases for generating an output data stream, the output data stream correlating a demand problem with a manufacturing solution.

11 Claims, 4 Drawing Sheets

DATA MINING TECHNIQUES FOR ENHANCING PRODUCT MANUFACTURING MANAGEMENT

This application is related to application Ser. No. 09/559,379, pending, to Kurtzberg, et al. filed Apr. 27, 2000; to application Ser. No. 09/604,535, pending, to Levanoni, et al. filed Jun. 27, 2000; to application Ser. No. 09/633,830, U.S. Pat. No. 6,658,422, to Levanoni, et al. filed Aug. 7, 2000; and to application Ser. No. 09/696,552, abandoned, to Levanoni, et al. filed Oct. 25, 2000. Each of these applications is co-pending and commonly assigned.

BACKGROUND OF THE INVENTION

1. Field of the Invention

This invention relates to methodology for utilizing data mining techniques in the area of product manufacturing management.

2. Introduction to the Invention

Data mining techniques are known and include disparate technologies, like neural networks, which can work to an end of efficiently discovering valuable, non-obvious information from a large collection of data. The data, in turn, may arise in fields ranging from e.g., marketing, finance, manufacturing, or retail.

SUMMARY OF THE INVENTION

We have now discovered novel methodology for exploiting the advantages inherent generally in data mining technologies, in the particular field of product manufacturing management applications.

Our work proceeds in the following way.

We have recognized that a typical and important "three-part" paradigm for presently effecting product manufacturing management, is a largely subjective, human paradigm, and therefore exposed to all the vagaries and deficiencies otherwise attendant on human procedures. In particular, this three-part paradigm we have in mind works in the following way. First, a product manufacturing manager develops a demand database comprising a compendium of individual demand history—e.g., the demand's response to historical manufacturing situations. Secondly, and independently, the product manufacturing manager develops in his mind a manufacturing database comprising the product manufacturing manager's personal, partial, and subjective knowledge of objective facts culled from e.g., the marketing literature, the business literature, or input from colleagues or salespersons. Thirdly, the product manufacturing manager subjectively correlates in his mind the necessarily incomplete and partial manufacturing database, with the demand database, in order to promulgate a prescribed individual's demand prescribed product manufacturing management evaluation and cure.

This three-part paradigm is part science and part art, and captures one aspect of the problems associated with product manufacturing management. However, as suggested above, it is manifestly a subjective paradigm, and therefore open to human vagaries.

We now disclose a novel computer method which can preserve the advantages inherent in this three-part paradigm, while minimizing its incompleteness and attendant subjectivities that otherwise inure in a technique heretofore entirely reserved for human realization.

To this end, in a first aspect of the present invention, we disclose a novel computer method comprising the steps of:

i) providing a demand database comprising a compendium of demand history;

ii) providing a manufacturing database comprising a compendium of at least one of product manufacturing management solutions, product manufacturing information, and product manufacturing diagnostics; and iii) employing a data mining technique for interrogating said demand and manufacturing databases for generating an output data stream, said output data stream correlating a demand problem with a manufacturing solution.

The novel method preferably comprises a further step of updating the step i) demand database, so that it can cumulatively track the demand history as it develops over time. For example, this step i) of updating the demand database may include the results of employing the step iii) data mining technique. Also, the method may comprise a step of refining an employed data mining technique in cognizance of pattern changes embedded in each database as a consequence of manufacturing results and updating the demand database.

The novel method preferably comprises a further step of updating the step ii) manufacturing database, so that it can cumulatively track an ever increasing and developing technical product manufacturing management literature. For example, this step ii) of updating the manufacturing database may include the effects of employing a data mining technique on the demand database. Also, the method may comprise a step of refining an employed data mining technique in cognizance of pattern changes embedded in each database as a consequence of results and updating the manufacturing database.

The novel method may employ advantageously a wide array of step iii) data mining techniques for interrogating the demand and manufacturing databases for generating an output data stream, which output data stream correlates a demand problem with a manufacturing solution. For example, the data mining technique may comprise inter alia employment of the following functions for producing output data: classification-neural, classification-tree, clustering-geographic, clustering-neural, factor analysis, or principal component analysis, or expert systems.

In a second aspect of the present invention, we disclose a program storage device readable by machine to perform method steps for providing an interactive product manufacturing management database, the method comprising the steps of:

i) providing a demand database comprising a compendium of individual demand history;

ii) providing a manufacturing database comprising a compendium of at least one of product manufacturing management solutions, product manufacturing information, and product manufacturing diagnostics; and iii) employing a data mining technique for interrogating said demand and manufacturing databases for generating an output data stream, said output data stream correlating a demand problem with a manufacturing solution.

In a third aspect of the present invention, we disclose a computer comprising:

i) means for inputting a demand database comprising a compendium of individual demand history;

ii) means for inputting a manufacturing database comprising a compendium of at least one of product manufacturing management solutions, product manufacturing information, and product manufacturing diagnostics;

iii) means for employing a data mining technique for interrogating said manufacturing databases; and iv) means for generating an output data stream, said output data stream correlating a demand problem with a manufacturing solution.

We have now summarized the invention in several of its aspects or manifestations. It may be observed, in sharp contrast with the prior art discussed above comprising the three part subjective paradigm approach to the problem of enhancing product manufacturing management, that the summarized invention utilizes inter alia, the technique of data mining. We now point out, firstly, that the technique of data mining is of such complexity and utility, that as a technique, in and of itself, it cannot be used in any way as an available candidate solution for enhancing this type of management, to the extent that the problem of product manufacturing management is only approached within the realm of the human-subjective solution to centers management. Moreover, to the extent that the present invention uses computer techniques including e.g., data mining techniques, to an end of solving a problem of product manufacturing management, it is not in general obvious within the nominal context of the problem as we have defined it and the technique of data mining, how they are in fact to be brought into relationship in order to provide a pragmatic solution to the problem of product manufacturing management. It is, rather, an aspect of the novelty and unobviousness of the present invention that it discloses, on the one hand, the possibility for using the technique of data mining within the context of product manufacturing management, and, moreover, on the other hand, discloses illustrative methodology that is required to in fact pragmatically bring the technique of data mining to bear on the actuality of solving the problem of product manufacturing management.

BRIEF DESCRIPTION OF THE DRAWING

The invention is illustrated in the accompanying drawing, in which.

DETAILED DESCRIPTION OF THE PRESENT INVENTION

The detailed description of the present invention proceeds by tracing through three quintessential method steps, summarized above, that fairly capture the invention in all its sundry aspects. To this end, attention is directed to the flowcharts and neural networks of FIGS. 1 through 4, which can provide enablement of the three method steps.

Figure 1:
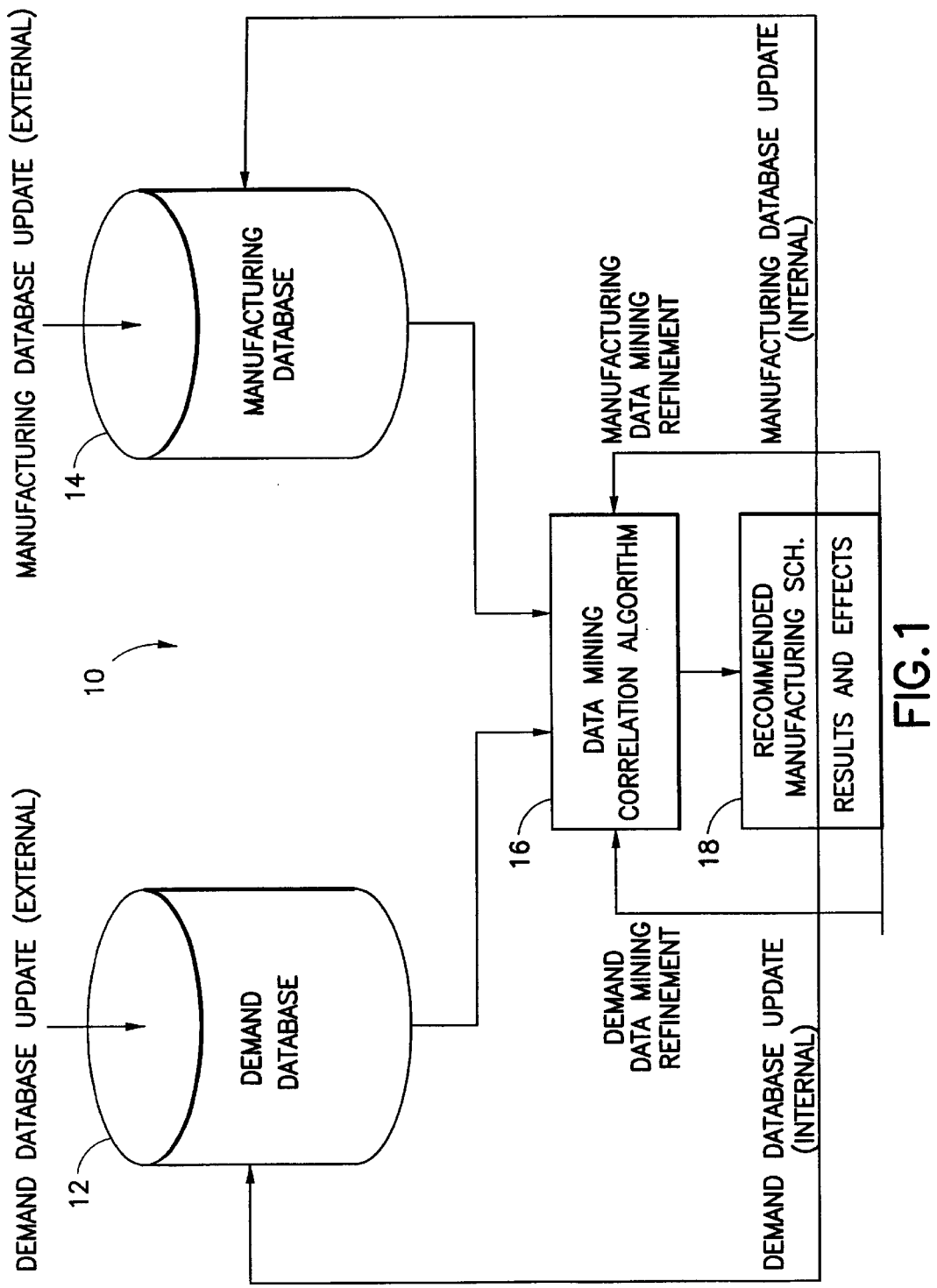
FIG. 1 provides an illustrative flowchart comprehending overall realization of the method of the present invention.

FIG. 1, numerals 10–18, illustratively captures the overall spirit of the present invention. In particular, the FIG. 1 flowchart (10) shows a demand database (12) comprising a compendium of individual demand history, and a manufacturing database (14) comprising a compendium of at least one of product manufacturing management solutions, product manufacturing centers information, and product manufacturing diagnostics. Those skilled in the art will have no difficulty, having regard to their own knowledge and this disclosure, in creating or updating the databases (12, 14) e.g., conventional techniques can be used to this end. FIG. 1 also shows the outputs of the demand database (12) and manufacturing database (14) input to a data mining correlation algorithm box (16). The data mining algorithm can interrogate the information captured and/or updated in the demand and manufacturing databases (12, 14), and can generate an output data stream (18) correlating demand problem with manufacturing solution. Note that the output of the data mining algorithm can be most advantageously, self-reflexively, fed as a subsequent input to at least one of the demand database (12), the manufacturing database (14), and the data mining correlation algorithm (16).

Figure 2:
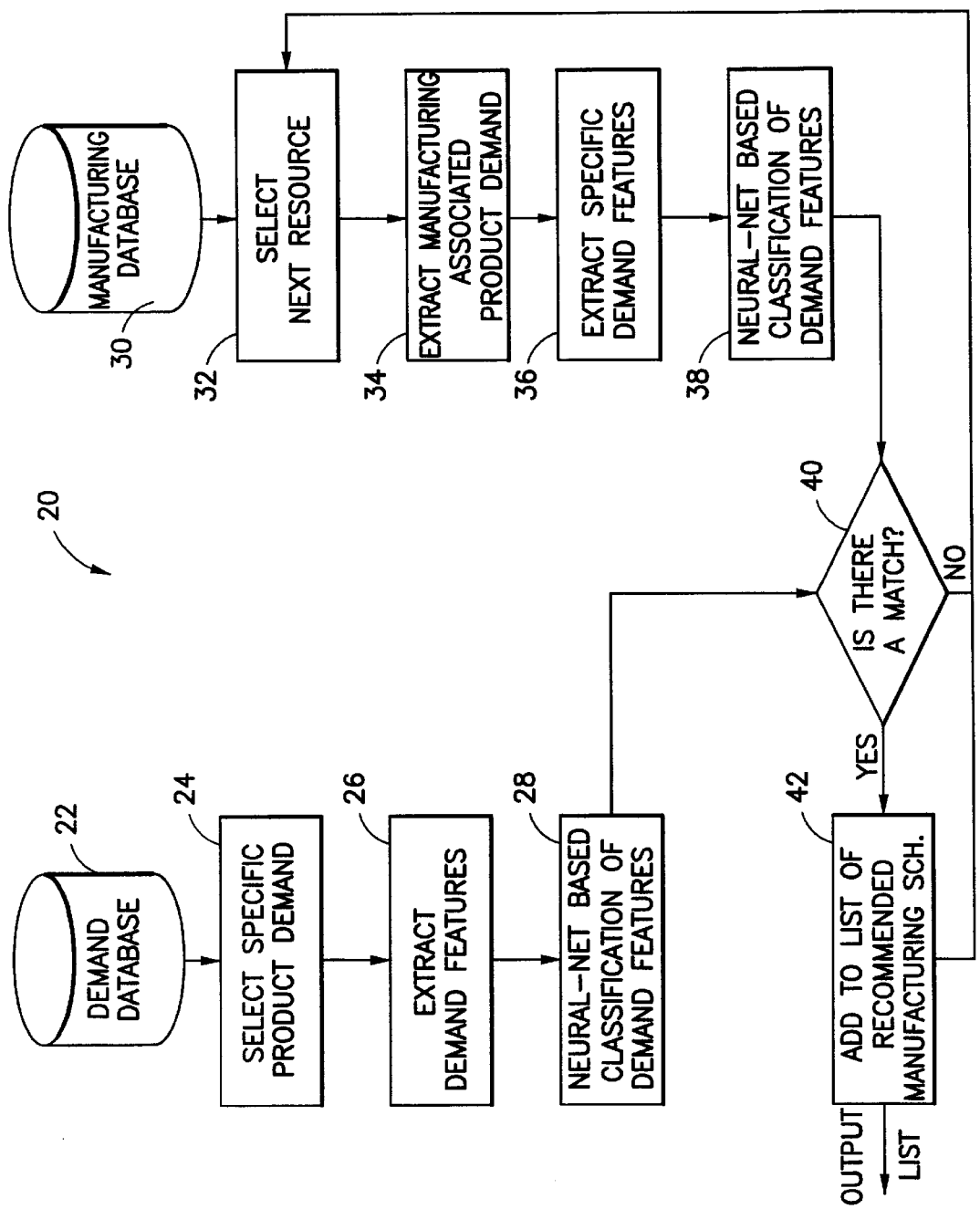
FIG. 2 provides an illustrative flowchart of details comprehended in the FIG. 1 flowchart.

Attention is now directed to FIG. 2, which provides a flowchart (20–42) that recapitulates some of the FIG. 1 flowchart information, but adds particulars on the immediate correlation functionalities required of a data mining correlation algorithm. For illustrative purposes, FIG. 2 comprehends the data mining correlation algorithm as a neural-net based classification of demand features, e.g., wherein a demand feature for say, cooking pots, may include pot style, size, handles, current local inventory, expected demand by week, etc.

Figure 3:
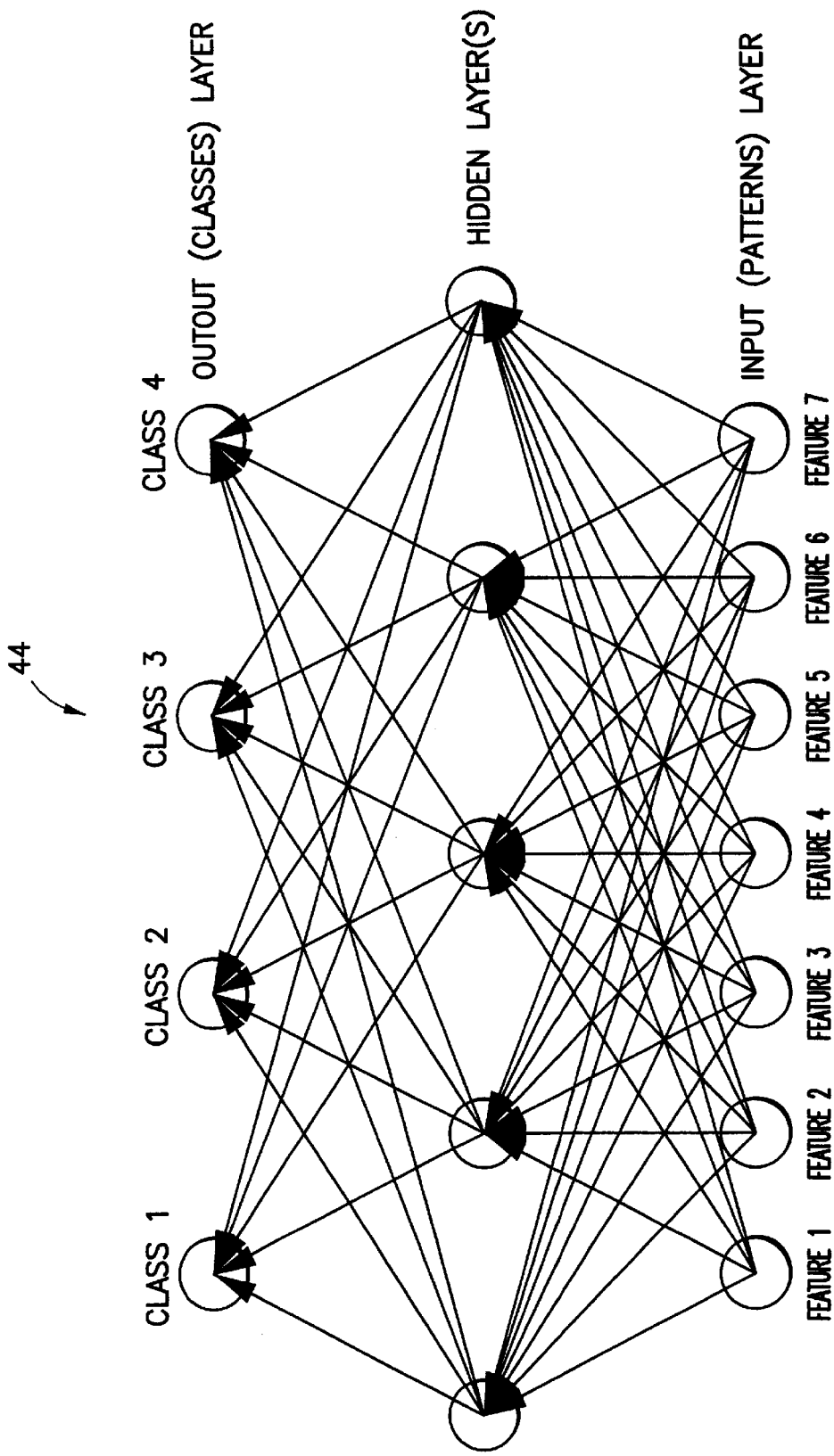
FIG. 3 shows a neural network that may be used in realization of the FIGS. 1 and 2 data mining algorithm.
Figure 4:
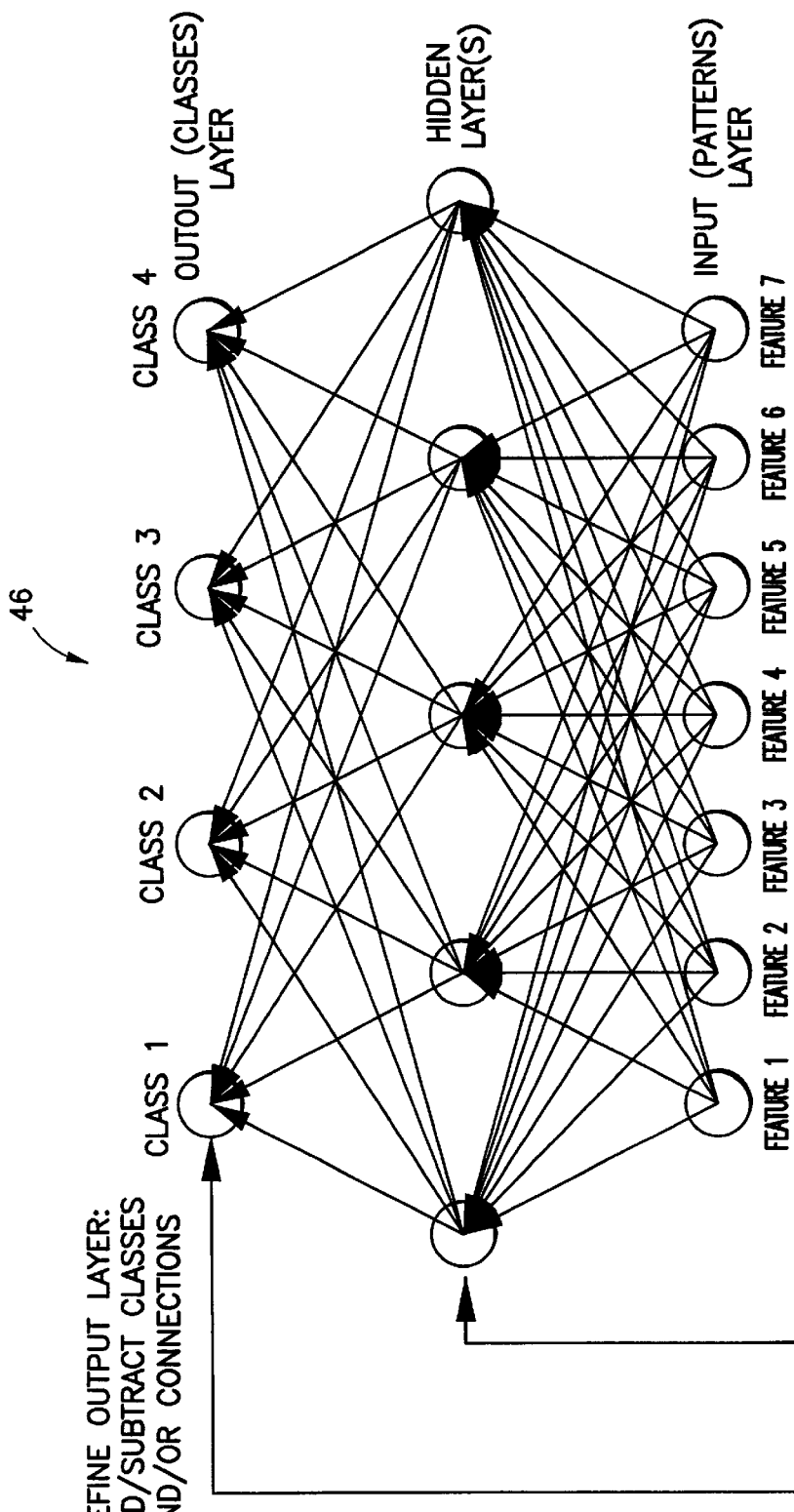
FIG. 4 shows further illustrative refinements of the FIG. 3 neural network.

FIG. 3, in turn, shows a neural-net (44) that may be used in realization of the FIGS. 1 and 2 data mining correlation algorithm. Note the reference to classes which represent classification of input features. The FIG. 3 neural-net (44) in turn, may be advantageously refined, as shown in the FIG. 4 neural-net (46), to capture the self-reflexive capabilities of the present invention, as elaborated above.

It is well understood that the computer system and method of the present invention can be implemented using a plurality of separate dedicated or programmable integrated or other electronic circuits or devices (e.g., hardwired or logic circuits such as discrete element circuits, or programmable logic devices such as PLDs, PLAs, PALs, or the like). A suitably programmed general purpose computer, e.g., a microprocessor, microcontroller, or other processor devices (CPU or MPU), either alone or in conjuction with one or more peripheral (e.g., integrated circuit) data and signal processing devices can be used to implement the invention. In general, any device or assembly of devices on which a finite state machine capable of implementing the flow charts shown in the figures can be used as a controller with the invention.

What is claimed:

1. A computer method comprising:
    providing a demand database comprising a compendium of individual demand history;
    providing a manufacturing database comprising a compendium of at least one of product manufacturing management solutions, product manufacturing information, and product manufacturing diagnostics; and
    employing a data mining technique for interrogating said demand and manufacturing databases for generating an output data stream, said output data stream correlating a demand problem with a manufacturing solution.

2. A method according to claim 1, further comprising:
    updating the demand database.

3. A method according to claim 2, wherein said updating the demand database comprises updating the demand database so that it includes the results of employing a data mining technique.

4. A method according to claim 2, further comprising refining an employed data mining technique in cognizance of pattern changes embedded in each data base as a consequence of updating the demand database.

5. A method according to claim 1, further comprising:
updating the manufacturing database.

6. A method according to claim 5, wherein said updating the manufacturing database comprises updating the manufacturing database so that it includes the effects of employing a data mining technique on the demand database.

7. A method according to claim 4, further comprising:
refining an employed data mining technique in cognizance of pattern changes embedded in each database as a consequence of updating the manufacturing database.

8. A method according to claim 1, wherein said data mining technique includes employing neural networks.

9. The method according to claim 8, wherein at least one of said demand database and said manufacturing database includes features of a demand and said neural networks are used to classify said features.

10. A program storage device readable by machine, tangibly embodying a program of instructions executable by the machine to perform a method for providing an interactive manufacturing management database, the method comprising:

providing a demand database comprising a compendium of individual demand history;

providing a manufacturing database comprising a compendium of at least one of product manufacturing management solutions, product manufacturing information, and product manufacturing diagnostics; and employing a data mining technique for interrogating said demand and manufacturing databases for generating an output data stream, said output data stream correlating a demand problem with a manufacturing solution.

11. A computer comprising:

means for inputting a demand database comprising a compendium of individual demand history;

means for inputting a database comprising a compendium of at least one of product manufacturing management solutions, product manufacturing information, and product manufacturing diagnostics;

means for employing a data mining technique for interrogating said demand and manufacturing databases; and means for generating an output data stream, said output data stream correlating a demand problem with a manufacturing solution.

* * * * *